(12) United States Patent
van den Boer

(10) Patent No.: US 8,574,472 B2
(45) Date of Patent: Nov. 5, 2013

(54) MOULDING DEVICE

(75) Inventor: Danny van den Boer, Lommel (BE)

(73) Assignee: MoMeXx B.V., Nieuwkuijk (NL)

( * ) Notice: Subject to any disclaimer, the term of this patent is extended or adjusted under 35 U.S.C. 154(b) by 92 days.

(21) Appl. No.: 13/063,981

(22) PCT Filed: Sep. 15, 2008

(86) PCT No.: PCT/IB2008/002406
§ 371 (c)(1),
(2), (4) Date: Mar. 15, 2011

(87) PCT Pub. No.: WO2010/029384
PCT Pub. Date: Mar. 18, 2010

(65) Prior Publication Data
US 2011/0187023 A1  Aug. 4, 2011

(51) Int. Cl.
*B29C 45/56* (2006.01)
(52) U.S. Cl.
USPC ...... 264/40.5; 264/40.7; 264/328.7; 425/145; 425/149; 425/150; 425/577
(58) Field of Classification Search
USPC ............ 264/40.1, 40.5, 328.7, 40.7; 425/145, 425/149, 150, 577
See application file for complete search history.

(56) References Cited

U.S. PATENT DOCUMENTS

| 4,522,778 | A |   | 6/1985  | Baciu et al. |
| 4,907,960 | A | * | 3/1990  | Hertzer .......................... 425/593 |
| 5,676,896 | A | * | 10/1997 | Izumida et al. ................ 264/132 |
| 6,440,351 | B1 | * | 8/2002 | Saito et al. ................... 264/328.7 |
| 7,090,800 | B2 | * | 8/2006 | Clarke ......................... 264/328.7 |
| 7,891,970 | B2 | * | 2/2011 | Hoogland ....................... 425/577 |
| 8,114,332 | B2 | * | 2/2012 | Clarke ......................... 264/328.7 |
| 2003/0164564 | A1 |  | 9/2003 | Klotz |
| 2004/0142057 | A1 |  | 7/2004 | Kao et al. |
| 2007/0231575 | A1 |  | 10/2007 | Watanabe et al. |

FOREIGN PATENT DOCUMENTS

| DE | 10214008 A1 | 10/2003 |
| JP | 01 146718 A1 | 6/1989 |
| WO | 91/08890 A1 | 6/1991 |
| WO | 2004/024416 A1 | 3/2004 |

OTHER PUBLICATIONS

Menges et al., How to Make Injection Molds, Third Edition, 2001, Hanser Publishers, pp. 593-596.*

* cited by examiner

*Primary Examiner* — Jill Heitbrink
(74) *Attorney, Agent, or Firm* — Hoffmann & Baron, LLP

(57) ABSTRACT

Moulding equipment for the production of plastic parts via the injection of a molten thermoplastic resin, chiefly consisting of a mould (2) which consists of at least two mould halves (3,4), which when closed together produce a cavity (11) and a core (8), wherein at least one mould half or mould part (3 and/or 4) contains at least one moveable mould part (7) with the necessary system to control the movement of the mould part or parts (7) using the active control of the cavity (11) pressure.

5 Claims, 1 Drawing Sheet

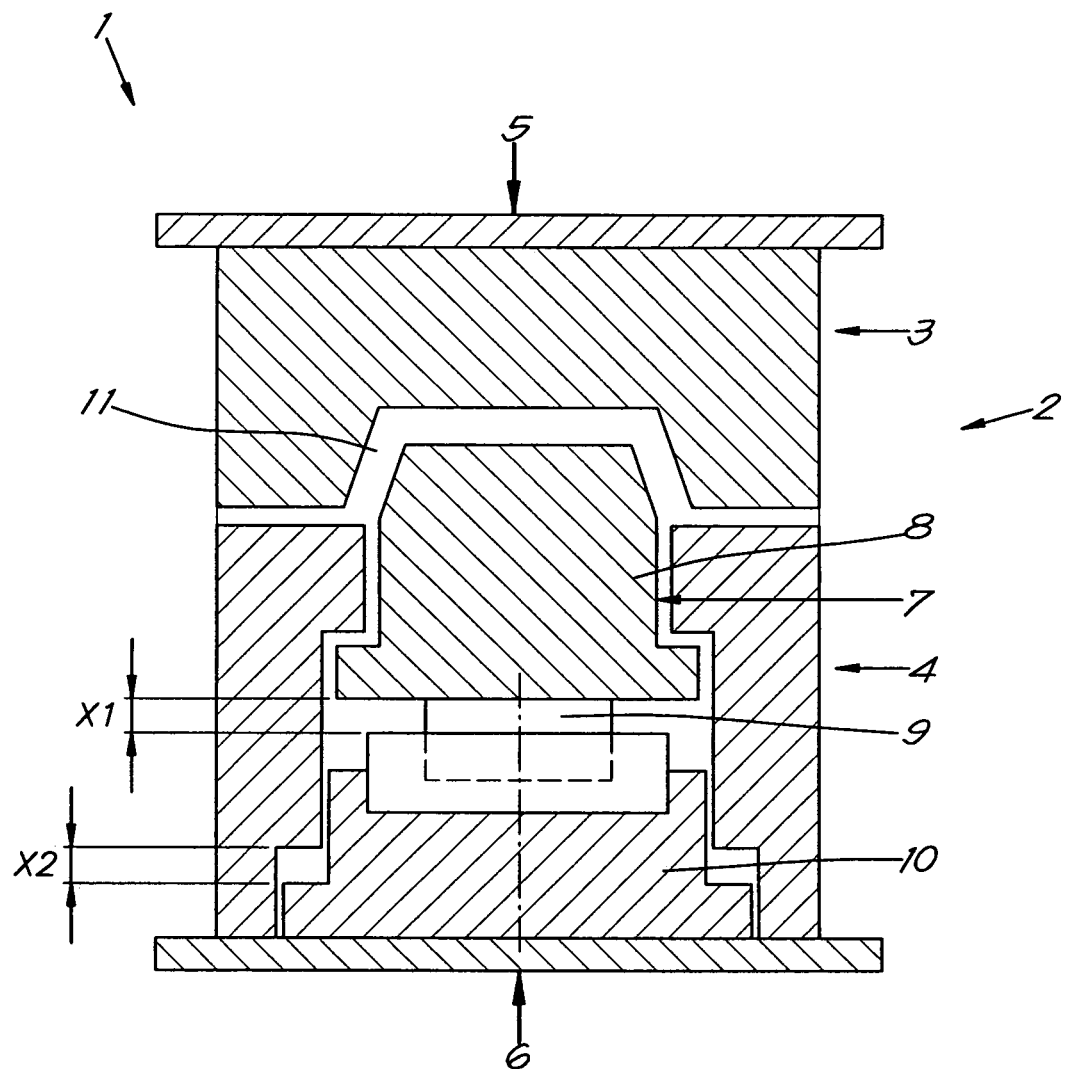

MOULDING DEVICE

CROSS-REFERENCE TO RELATED APPLICATIONS

This application is the National Stage of International Application No. PCT/IB2008/002406, filed Sep. 15, 2008, the contents of which is incorporated by reference herein.

FIELD OF THE INVENTION

The current invention refers to a moulding equipment.

More specifically the invention refers to equipment for injection moulding plastics.

BACKGROUND OF THE INVENTION

The invention can also be applied to the injection of other materials, for example metals such as aluminium or brass and hence the invention is not necessarily limited to just the injection of plastics only.

The invention equally can be applied in the case that the moulding equipment needs to be modified.

With conventional injection moulding of plastics, molten plastic is injected, under relatively high pressure, into a clamped closed mould cavity.

With this system of injecting into a closed mould cavity the pressure builds up inside the mould and is dependent on the type of plastic material that is being used.

With this conventional technique and its resulting high pressure there are limitations on the maximum flow paths and material wall thicknesses that can be achieved. This results in turn in in-built stresses and quality loss in the product.

On the other hand there are known techniques in which the mould cavity size is increased by not fully closing the mould itself during the initial injection of the material. Thereafter the mould is closed using an adapted mould closing system on the injection machine.

Such a technique is referred to as (Injection) Compression Moulding which has the main drawback of being a process that has limited control, in contrast to the above referred to conventional technique of injection moulding.

Widely known is also an improved variant of compression moulding whereby moveable internal mould parts called cores (or slides) are retracted to a position that results in an enlargement of the mould cavity at the beginning point of the injection of the material.

Following the injection of the material the moveable cores are pushed forward, via a separate mechanism in the machine, to fully compress the material in the mould.

This is a definite improvement over conventional compression moulding from the point of view of control of the process.

Both processes offer improvements in the flow path to wall thickness ratio as well as reduction in the internal part stress of the finished product.

A known disadvantage of the latter method is that the material flows in an uncontrolled manner into the mould, which is a relatively large open space.

As a result the chances are high that flow front lines are produced in the final product.

Furthermore the plastic cools at the contact areas, in an uncontrolled manner, between which the hotter high flow material then gets pressed.

The resultant formation of such jetting effects is an important drawback in particular with amorphous materials especially when the visual aspect of the product is important.

Uncontrolled crystallisation also results in the formation of undesirable cold fronts in the material that can lead to weaknesses and quality issues in the end product.

Neither can one, in a simple manner, control what internal pressures are needed to compress the fluid plastic melt between these cold fonts to fill the cavity completely and reach the desired wall thickness.

Similarly in this context patent EP 1208955 of the company Intercable SRL publishes injection systems for plastics that specifically involve the use of a mould that contains one or more cylindrical controlled cavities in which the flat side of the mould cavity is closed by virtue of a movable core.

In the start position the core is placed against, or at a very small distance from, the opposite flat side of the cylindrical mould resulting in a cavity with either no or extremely low space.

During the injection of the thermoplastic resin the core, which is held in place via an appropriate counterpressure, is slowly pushed back from its starting position resulting in the cavity space being increased in a controlled and symmetrical fashion until finally the full cavity opening is realised.

This allows for the injection of thick wall cylindrical parts that have a smooth stress free surface, for example cylindrical wine bottle cork type shapes.

A known disadvantage is that the moulded parts are relatively small and thick walled and that the part design is limited to just very simple cylindrical parts.

Equally known from patents NL 7906154 and U.S. Pat. No. 4,185,835 of General Electric Schenectady in New York is a process for the injection of plastics, where the mould comprises a stationary unit with a female and male half, which incorporates a moveable compression core.

The mould cavity is defined as the space between the female and male mould halves.

Further the equipment contains the means to inject thermoplastic resin into the mould and the means to control the compression core during the last 20-25% of the injection cycle.

The compression core would be moved by 0.25 mm to 0.50 mm forwards in order to keep the part under a certain compression during the cooling phase.

A well know drawback of this process is that it can only be used to produce parts that are essentially flat or slightly bent such as for example optical lenses for sunglasses, safety glasses and so forth and which preferably have a wall thickness of 3.6 to 3.5 mm.

Further known from patent DE 4301320 of Peguform-Werke GmbH, Germany, is a plastics process in which the mould has two halves in between which, in closed form, the cavity is defined and whereby at least one of the mould halves contains one or more moveable cores.

The moveable core(s) can be moved into the cavity and in such a way that they come into contact with the opposite half of the mould.

As a result, in a specific starting condition, the surface of at least one of the mould halves is reduced with the consequence that the mould closing force is lowered.

Following a partial hardening of the material, the cores are retracted from the cavity and newly formed cavities are then filled in a second step under reduced injection pressure.

A known drawback of such a process is that only products with a simple geometry can be produced given that the moveable core can only close onto the opposite form half in a perpendicular way in order to have the effect of lowering the machine's closing force, by reducing the surface area of the mould half A further drawback of this method is that flow lines and stresses are produced in and around the cavities that are formed following the withdrawal of the moveable cores, which are then filled in a second injection step. These flow lines and stress lines cannot be removed despite various secondary treatments, such as thermal annealing.

In summary one can say that all the above mentioned processes are more machine process linked meaning that it is not possible to have a closed loop process control of the system without taking into account the material properties.

SUMMARY OF THE INVENTION

The objective of the current invention is to offer a solution to the drawbacks of the processes mentioned above as well as others due to the fact that the process can be variable according to specific parameters which can be set as opposed to a fixed process type which cannot be varied according to specific parameters, which means that the application possibilities are much wider (thin wall and thick wall moulding, different materials etc.)

The present invention uses as basis a machine that produces plastic parts by injecting a molten thermoplastic with the use of a mould that comprises of at least two mould or part halves which when closed comprise a cavity and a core, whereby in at least one of the mould or part halves at least one moveable mould part is included and whereby the design means is included for the control of the movement of the moveable mould part or parts via active control of the pressure in the cavity.

An advantage is that the design allows for longer flow paths of the molten material to be achieved and for better control of the flow.

As a result internal part stresses are eliminated, better part quality is achieved with longer usage time, better chemical and physical resistance with excellent surface finish.

A further advantage is that cooling times are significantly reduced with the result that the cycle times are much reduced. This then has a direct impact on the production cost and the parts can be produced in high volumes at lower cost and besides this the energy cost is reduced as well with the consequent reduction in greenhouse gases as a result.

Another advantage is that the minimum amount of machine clamp force can be used as is necessary according to the design, meaning that special heavy expensive equipment construction and frequent resetting of the machine parameters are avoided.

According to a preferable application of the invention the cavity and/or the core and/or both will be moveable and encased in the mould construction. Furthermore the machine will be equipped so as to maintain the moving mould part or parts in position by means of a resistance pressure, which will be determined by the properties of the plastic material such as melt viscosity, melt flow etc. as well as by the pressure applied to the core.

Preferentially the machine will be equipped to control the displacement of the moveable mould part or parts, that are cavity pressure driven, so that during injection of the plastic material the cavity is enlarged as a result of the mould part (s) displacement and at the same time the material flow is controlled.

In a practical application the machine was equipped so that the moveable mould part or parts could be moved back at a controlled speed and as a function of the cavity pressure to its/their original position, whereby the cavity form exactly equalled the product form, following the injection of the thermoplastic.

In the most preferential application the machine is equipped to control the movement of the moveable mould part or parts by hydraulic, pneumatic or mechanical means such as for example hydraulic cylinders or rods or by a combination of one or more of these.

Moreover according to a more preferential application the moveable mould part or parts consist of different parts that are able to be moved or positioned either individually or combined together, at a controlled speed as a function of the internal cavity pressure.

BRIEF DESCRIPTION OF THE DRAWINGS

With a view to better demonstrating the key principles of the invention an example of a preferred embodiment of the equipment, without restriction, is described, with reference to the attached schematic drawing wherein:

FIG. 1 schematic represents a mould cross section.

DETAILED DESCRIPTION OF PREFERRED EMBODIMENTS

FIG. 1 shows a cross section of the equipment 1, consisting of a mould 2 which in turn consists of two part forms or mould halves 3 and 4, which are held closed together by a closing force indicated by the arrows 5 and 6.

In the mould half 4 is housed the moveable mould part 7.

The moveable mould part 7 is in turn composed of a moveable core 8, which can reach into the other mould half 3, and an adjustable positioning device that is simply shown here by a hydraulic cylinder 9, whereby the core 8 can be moved up and back over a variable distance X1 or just kept in position.

A second adjustable positioning device, here simply shown by an hydraulic cylinder 10, can function separately or in combination with the cylinder 9, to position the moveable core 8 back to its initial or starting position via controlled movement over the distance X2.

Between the moveable core 8 and the mould half 3 a cavity 11 is defined, the form of which is equal to that of the final product at the beginning and end point of each cycle, into which the molten thermoplastic resin is injected and following cooling the final product is ejected from the mould 2.

For clarity's sake the rest of the system is largely excluded from the diagram namely the equipment to inject the molten thermoplastic, the ejection pins, the positioning directors, the warming and cooling circuits, thermal control system, the hydraulic cyclinders and connections, the sensors etc.

The mechanism of the mould 1 is very simple as follows.

Initially the mould 2 is closed under a certain closing pressure 5, 6 with the mould halves 3, 4 pressed against each other. Hereby the internal moveable part 7 with its moveable core 8 are brought into a position wherein the cavity dimension in the cavity 11 equals the dimensions of the final product.

In order to realise this the moveable mould part 7 can be moved up and down along the distance X1 via the use of the adjustable positioning device or devices 9, 10.

These adjustable positioning devices can be operated hydraulically, and/or pneumatically and/or under gas pressure, and/or mechanically, for example using a rod system, either separately or combined together.

The core 8 which together with the mould half 3 defines the cavity 11 is held in position by a certain predetermined resistance pressure, for example using the adjustable positioning device 9.

The molten thermoplastic is injected in the conventional way into the cavity 11, wherein the position of the moveable mould part 8 is held in position and controlled by the resistance pressure, which is determined by amongst other things the properties of the injected material and its flow rheology.

As a result the size of the cavity 11 is temporarily increased and this is driven and controlled by the cavity pressure resulting in longer flow paths and optimal and specific melt flow and material distribution in the mould cavity 11.

At the moment that the flow rate drops then the moveable mould part 8 is returned to its original position and the cavity 11 form once again equals that of the end product whereby the direction and control is again determined by the effective pressure and process conditions in the mould cavity 11 itself.

After sufficient solidification of the part under controlled cooling conditions the products are exited from the mould at the right moment in the conventional manner.

The invention also is useful for an application that uses the equipment design.

Herewith an example of a preferred embodiment that is described further to demonstrate the invention without restriction.

Starting from a closed mould 2 with the moveable mould part or parts 7 in their position at the end of the cycle whereby the cavity form in the cavity 11 exactly equals the form of the product.

The moveable mould part or parts 7 are locked in position by a predetermined pressure that is asserted from behind the part.

This pressure can be pneumatic, hydraulic or mechanical i.e. with a rod.

As a result it is possible to accurately control the internal cavity pressure.

Hence upon injection of the molten thermoplastic into the cavity 11, and dependent on the material properties such as the melt viscosity and the core tension, the moveable mould part or parts 7 are held in position under a pressure.

Upon injection of the material the melt flow will be controlled by the moveable mould part or parts 7, which are cavity pressure controlled and are pushed back over a variable distance X1 resulting in an expansion of the cavity 11.

As a result jetting effects, flow lines and undesired crystallisation are avoided.

As soon as the melt flow rate drops the moveable mould part or parts 7 are moved back to the start position, via the control of the resistance pressure, at a controlled rate as a function of the cavity pressure.

Hence, with this technique, longer flow paths with improved flow control are achieved with the molten plastic in this mould cavity 11.

Further internal stress in the final product is eliminated.

The molten thermoplastic melt is, as such, perfectly distributed and guided in the mould cavity 11.

Besides this cooling times are significantly shortened with the resulting drop in cycle times giving the advantages that were described earlier The need to increase the mould closing force on both mould halves 3 and 4 is absolutely not necessary with this technique All pressures, mould cavity volume changes and movements are set up and completely controlled With this technique the process can be set up and specifically controlled by machine and process settings as opposed to simply operating conditions, which expands the application potential (production of thick and thin wall products in different materials etc).

The current invention is not restricted to the examples given here above nor by the schematic diagram example. In fact the equipment design and application can vary in all manner of forms and dimensions and be practised in all kinds of application forms without exceeding the limits of the invention.

What is claimed is:

1. Moulding equipment for injection compression moulding plastic parts via the injection of a molten thermoplastic resin, comprising:
   a mould which comprises at least two mould halves, which when closed together produce a cavity;
   a moveable core, which, when the mould halves are in the closed position, is moveable relative to the first and second mould halves by a positioning device, wherein at least one mould half contains the moveable core; and
   a control system comprising an adjustable positioning device to control the movement of the moveable core using the active control of the cavity pressure,
   wherein the control system is configured to:
   position the moveable core in a start position prior to the injection of the molten thermoplastic resin, in which start position the cavity size and form is equal to that of the product to be produced,
   upon injection, hold the moveable core in the start position by a predetermined back pressure exerted on the rear side of the moveable core, and
   during injection of the molten thermoplastic resin into the cavity, measure the cavity pressure and adjust the adjustable positioning device on the basis of the measured cavity pressure to move the moveable core as a function of the measured cavity pressure in order to increase the cavity size, and
   at the moment that the injection flow rate of the resin drops, return the moveable core to the start position in a controlled fashion and as a function of the cavity pressure, wherein in this start position the mould cavity is again identical in dimensions to the size and form of the product that is produced.

2. The moulding equipment according to claim 1, further comprising a system that maintains moveable mould part or parts in position under a pressure that is dependent on the material properties of the injected resin.

3. The moulding equipment according to claim 1, wherein the control system for the movement of the moveable mould part or parts is based on a device selected from the group consisting of a hydraulic device, a pneumatic device, a mechanical device, and combinations thereof.

4. The moulding equipment according to claim 1, wherein the moveable mould part or parts are themselves composed of separate parts with a control system that allows the individual separate parts to be moved or positioned either separately or together with a controlled speed and as a function of the cavity pressure.

5. A method of injection-compression moulding, comprising:
   a. providing a moulding equipment according to claim 1;
   b. prior to the injection of the molten thermoplastic resin, closing the cavity and bringing the moveable core into the start position, wherein the cavity form is exactly equal to that of the product to be produced;
   c. upon injection, holding the moveable core in position by a predetermined back pressure asserted on the rear side of the moveable core;
   d. during injection of the molten thermoplastic resin into the cavity, measuring the cavity pressure and adjusting the adjustable positioning device on the basis of the measured cavity pressure, thereby moving the moveable core in such a way, as a function of the cavity pressure, that the cavity is increased and the molten resin flow is controlled; and e. at the moment that the flow rate of the resin drops off, returning the moveable core to the original start position in a controlled fashion and as a function of the cavity pressure, in this start position the mould cavity is again identical in dimensions to the form of the product that is being produced.

* * * * *